US008153544B2

(12) United States Patent
Nagy et al.

(10) Patent No.: US 8,153,544 B2
(45) Date of Patent: Apr. 10, 2012

(54) METHOD FOR PREPARING NON-METALLOCENE CATALYSTS

(75) Inventors: Sandor Nagy, Naperville, IL (US); Linda N. Winslow, Cincinnati, OH (US); Shahram Mihan, Bad Soden (DE); Reynald Chevalier, Frankfurt (DE); Lenka Lukesova, Frankfurt (DE); Ilya E. Nifant'ev, Moscow (RU); Pavel V. Ivchenko, Moscow (RU); Karen L. Neal-Hawkins, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 280 days.

(21) Appl. No.: 12/460,640

(22) Filed: Jul. 22, 2009

(65) Prior Publication Data

US 2011/0021344 A1 Jan. 27, 2011

(51) Int. Cl.
*C07F 7/00* (2006.01)
*C07F 7/28* (2006.01)
*B01J 31/22* (2006.01)

(52) U.S. Cl. .......... 502/152; 502/167; 502/150; 556/56; 556/54; 556/13; 556/19

(58) Field of Classification Search .................. None
See application file for complete search history.

(56) References Cited

U.S. PATENT DOCUMENTS

| | | | |
|---|---|---|---|
| 5,153,157 A | 10/1992 | Hlatky et al. | |
| 5,198,401 A | 3/1993 | Turner et al. | |
| 5,241,025 A | 8/1993 | Hlatky et al. | |
| 5,414,180 A | 5/1995 | Geerts et al. | |
| 5,637,660 A * | 6/1997 | Nagy et al. | 526/160 |
| 5,648,440 A | 7/1997 | Sugano et al. | |
| 5,889,128 A | 3/1999 | Schrock et al. | |
| 6,103,657 A | 8/2000 | Murray | |
| 6,211,311 B1 | 4/2001 | Wang et al. | |
| 6,271,323 B1 | 8/2001 | Loveday et al. | |
| 6,653,417 B2 | 11/2003 | Peterson | |
| 6,706,829 B2 | 3/2004 | Boussie et al. | |
| 6,852,659 B1 | 2/2005 | Kao et al. | |
| 6,939,969 B2 * | 9/2005 | Peters et al. | 546/171 |
| 6,953,764 B2 | 10/2005 | Frazier et al. | |
| 7,049,378 B2 | 5/2006 | Ittel et al. | |
| 7,115,689 B2 | 10/2006 | Coalter, III et al. | |
| 7,157,400 B2 | 1/2007 | Boussie et al. | |
| 7,253,133 B2 | 8/2007 | Sun et al. | |
| 7,423,101 B2 | 9/2008 | Solan et al. | |
| 7,439,205 B2 | 10/2008 | Razavi et al. | |
| 2005/0148744 A1 * | 7/2005 | Kao | 526/114 |
| 2005/0209420 A1 * | 9/2005 | Solan et al. | 526/172 |
| 2008/0177020 A1 | 7/2008 | Agapie et al. | |
| 2008/0182952 A1 | 7/2008 | Giesbrecht et al. | |

FOREIGN PATENT DOCUMENTS

WO WO 02/40550 A2 5/2002
WO WO 2008/036882 A1 3/2008

OTHER PUBLICATIONS

Bei et al., "Synthesis, Structures, Bonding, and Ethylene Reactivity of Group 4 Metal Alkyl Complexes Incorporating 8-Quinolinolato Ligands," *Organometallics*, (1997), 16, 3283-3302.

Mao et al., "New tridentate cyclometalated platinum(II) and palladium(II) complexes of N, 2-diphenyl-8-qunolinamine: syntheses, crystal structures, and photophysical properties," *Tetrahedron Letters*, (2005), 46, 8419-8422.

Ittel, et al., "Late-Metal Catalysts for Ethylene Homo- and Copolymerization," *Chem. Rev.* 100 (2000) 1169-1203.

Agapie et al., "Zirconium and Titanium Complexes Supported by Tridentate $LX_2$ Ligands Having Two Phenolates Linked to Furan, Thiophene, and Pyridine Donors: Precatalyts for Propylene Polymerization and Oligomerization," *Organometallics*, (2008), 27, 6245-6256.

* cited by examiner

*Primary Examiner* — Melvin Mayes
*Assistant Examiner* — Yun Qian

(57) ABSTRACT

A method of preparing supported catalysts useful for olefin polymerization is described. The catalysts comprise a Group 4 metal complex that incorporates a tridentate dianionic ligand. An activator mixture is first made from a boron compound having Lewis acidity and an excess of an alumoxane. The activator mixture is then combined with a support and the Group 4 metal complex to give a supported catalyst. The method provides an active, supported catalyst capable of making high-molecular-weight polyolefins.

20 Claims, No Drawings

METHOD FOR PREPARING NON-METALLOCENE CATALYSTS

FIELD OF THE INVENTION

The invention relates to ways to prepare non-metallocene catalysts useful for polymerizing olefins. The catalysts incorporate a tridentate dianionic ligand.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include controlled molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes incorporate one or more cyclopentadienyl (Cp) or Cp-like anionic ligands such as indenyl, fluorenyl, or the like, that donate pi-electrons to the transition metal. Non-metallocene single-site catalysts, including ones that capitalize on the chelate effect, have evolved more recently. Examples are the bidentate 8-quinolinoxy or 2-pyridinoxy complexes of Nagy et al. (see U.S. Pat. No. 5,637,660), the late transition metal bisimines of Brookhart et al. (see *Chem. Rev.* 100 (2000) 1169), and the diethylenetriamine-based tridentate complexes of McConville et al. or Shrock et al. (e.g., U.S. Pat. Nos. 5,889,128 and 6,271,323).

In numerous recent examples, the bi- or tridentate complex incorporates a pyridyl ligand that bears a heteroatom β- or γ- to the 2-position of the pyridine ring. This heteroatom, typically nitrogen or oxygen, and the pyridyl nitrogen chelate the metal to form a five- or six-membered ring. For some examples, see U.S. Pat. Nos. 7,439,205; 7,423,101; 7,157,400; 6,653,417; and 6,103,657 and U.S. Pat. Appl. Publ. No. 2008/0177020. In some of these complexes, an aryl substituent at the 6-position of the pyridine ring is also available to interact with the metal through C—H activation to form a tridentate complex (see, e.g., U.S. Pat. Nos. 7,115,689; 6,953,764; 6,706,829). Less frequently, quinoline-based bi- or tridentate complexes have been described (see, e.g., U.S. Pat. Nos. 7,253,133; 7,049,378; 6,939,969; 6,103,657; 5,637,660 and *Organometallics* 16 (1997) 3282).

Unfortunately, many non-metallocene complexes are known to have low activities compared with metallocenes when prepared using traditional supporting procedures with conventional activators and supports. For example, non-metallocenes, supported on MAO-treated silica, are often less active than required for commercial viability.

New activating protocols are therefore needed for non-metallocenes. Particularly valuable methods would provide high activity for polymerizing olefins with non-metallocenes and silica supports. Ideally, the resulting catalysts would have the potential to make ethylene copolymers having high or very high molecular weights.

SUMMARY OF THE INVENTION

The invention relates to a method for preparing supported catalysts useful for polymerizing olefins. The catalysts comprise a Group 4 metal complex that incorporates a dianionic, tridentate ligand. In the inventive method, a boron compound having Lewis acidity is first combined with an excess of an alumoxane to produce an activator mixture. This activator mixture is then combined with a support and the dianionic tridentate complex to give a supported catalyst. The supported catalysts allow efficient polymerization to produce polyolefins with good high-molecular-weight potential.

DETAILED DESCRIPTION OF THE INVENTION

Catalysts prepared by the method of the invention are particularly useful for polymerizing olefins. They comprise an activated Group 4 transition metal complex. Group 4 metals include zirconium, titanium, and hafnium. Zirconium and titanium are particularly preferred.

The first step in the inventive method involves preparation of an activator mixture. This mixture is produced by combining a boron compound having Lewis acidity with excess alumoxane.

Suitable boron compounds are Lewis acids, particularly compounds having one or more electron-withdrawing groups attached. Examples include ionic borates, boranes, borinic acids, boronic acids, and the like, and mixtures thereof. Perfluorinated organoboron compounds are preferred. Specific examples include lithium tetrakis(pentafluorophenyl)borate, sodium tetrakis(pentafluorophenyl)borate, anilinium tetrakis(pentafluorophenyl)borate, trityl tetrakis(pentafluorophenyl)borate ("F20"), tris(pentafluorophenyl)borane ("F15"), triphenylborane, tri-n-octylborane, bis(pentafluorophenyl)borinic acid, pentafluorophenylboronic acid, and the like. Other suitable boron compounds are described in U.S. Pat. Nos. 5,153,157, 5,198,401, and 5,241,025, the teachings of which are incorporated herein by reference.

Suitable alumoxanes are well known, and many are commercially available as solutions in hydrocarbon solvents from Albemarle, Akzo Nobel, and other suppliers. Examples include methylalumoxane, ethylalumoxane, isobutylalumoxane, and the like. Methylalumoxanes, such as MAO, MMAO, or PMAO are particularly preferred.

The alumoxane is used in excess compared with the amount of boron compound. Preferably, the alumoxane and boron compound are used in amounts that provide an aluminum to boron (Al/B) molar ratio within the range of 2 to 1000, more preferably from 10 to 500, most preferably from 50 to 250.

The activator mixture is combined with a support and a dianionic, tridentate Group 4 metal complex to give the supported catalyst. In one approach, the activator mixture is first combined with the complex, followed by the support. In another approach, activator mixture is first combined with the support, followed by the complex.

Thus, suitable non-metallocene complexes include, in addition to the Group 4 metal, a dianionic, tridentate ligand. The ligand is "tridentate" and "dianionic" in that it binds to the metal with two anionic sites and one neutral site. The neutral site is preferably a tertiary amine. The anionic sites can incorporate any of a variety of carbon, oxygen, nitrogen, or sulfur anions. The tertiary amine and anionic sites coordinate with the Group 4 metal to give 5-, 6-, or 7-membered rings in the tridentate complex.

Preferred dianionic, tridentate ligands include 2-aryl-8-anilinoquinolines, 2-(2-aryloxy)quinolines (including 2,8-bis(2-aryloxy)quinolines and 2-(2-aryloxy)-8-anilinoquinolines), and 2-(2-aryloxy)dihydroquinolines.

Among 2-aryl-8-anilinoquinolines, preferred complexes have the structure:

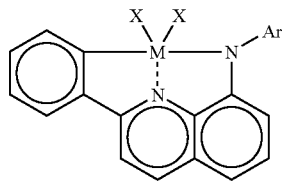

in which M is a Group 4 transition metal, Ar is an aryl group, each X is independently selected from the group consisting of halide, amide, alkyl, aryl, and alkaryl, and any of the ring carbons is optionally substituted with an alkyl, aryl, halide, alkoxy, trialkylsilyl, dialkylamino, or haloalkyl group, or any pair of adjacent ring carbons are joined to form a 5 to 7-membered carbocyclic or heterocyclic ring.

Among 2-(2-aryloxy)quinolines, preferred complexes include 2-(2-aryloxy)-8-anilinoquinolines, some of which have the structure:

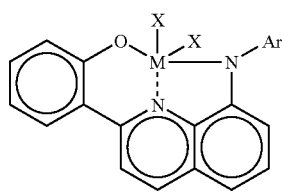

in which M is a Group 4 transition metal, Ar is an aryl group, each X is independently selected from the group consisting of halide, amide, alkyl, aryl, and alkaryl, and any of the ring carbons is optionally substituted with an alkyl, aryl, halide, alkoxy, trialkylsilyl, dialkylamino, or haloalkyl group, or any pair of adjacent ring carbons are joined to form a 5 to 7-membered carbocyclic or heterocyclic ring.

Other preferred 2-(2-aryloxy)quinoline complexes are 2,8-bis(2-aryloxy)quinolines, i.e., they have a 2-aryloxy substitutent attached to both the 2- and 8-positions of the quinoline ring. Particularly preferred among these are complexes that have the structure:

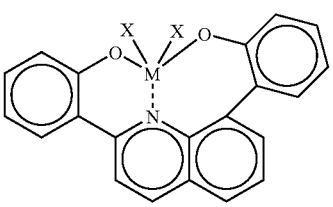

in which M is a Group 4 transition metal, each X is independently selected from the group consisting of halide, amide, alkyl, aryl, and alkaryl, and any of the ring carbons is optionally substituted with an alkyl, aryl, halide, alkoxy, trialkylsilyl, dialkylamino, or haloalkyl group, or any pair of adjacent ring carbons are joined to form a 5 to 7-membered carbocyclic or heterocyclic ring.

Particularly preferred complexes of this type have the structure:

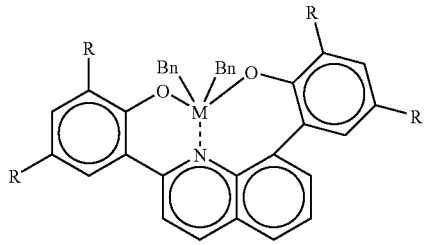

in which Bn is benzyl and each R is independently selected from the group consisting of methyl, ethyl, n-propyl, isopropyl, n-butyl, and tert-butyl.

Other preferred complexes are 2,8-bis(2-aryloxy)dihydroquinolines. Some of these complexes have the structure:

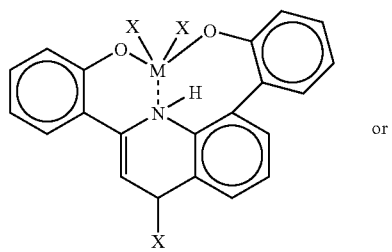

or

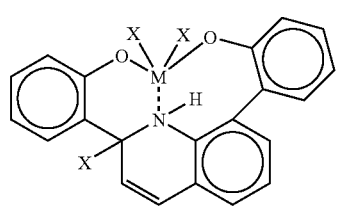

in which M is a Group 4 transition metal, each X is independently selected from the group consisting of halide, amide, alkyl, aryl, and alkaryl, and any of the ring carbons is optionally substituted with an alkyl, aryl, halide, alkoxy, trialkylsilyl, dialkylamino, or haloalkyl group, or any pair of adjacent ring carbons are joined to form a 5 to 7-membered carbocyclic or heterocyclic ring.

Particularly preferred complexes of this type have the structure:

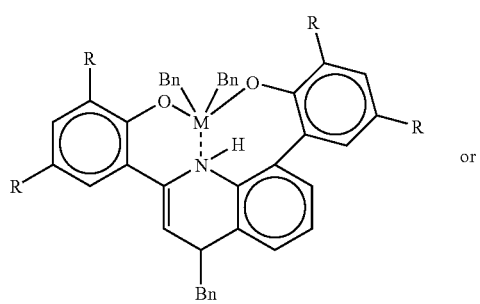

or

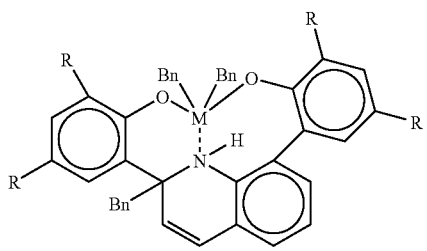

in which Bn is benzyl and each R is independently selected from the group consisting of methyl, ethyl, n-propyl, isopropyl, n-butyl, and tert-butyl.

Suitable non-metallocene complexes include diethylenetriamine-based complexes such as those described in U.S. Pat. Nos. 5,889,128 and 6,271,323, the teachings of which are incorporated herein by reference. Some of these complexes comprise a bis(2-anilinoethyl)amine ligand.

A few exemplary complexes:

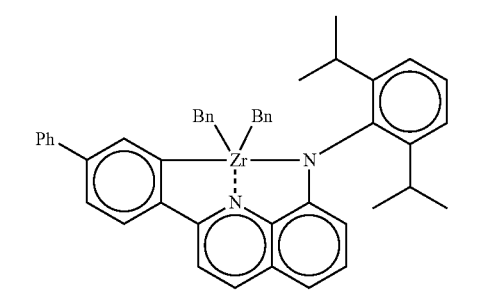

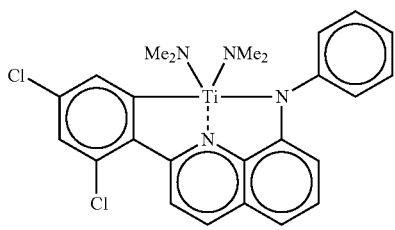

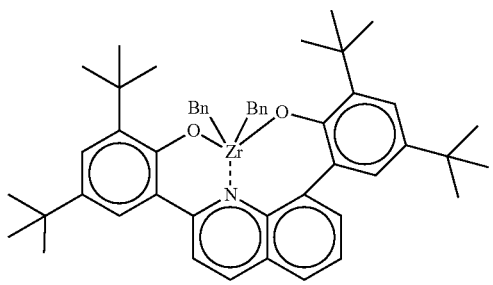

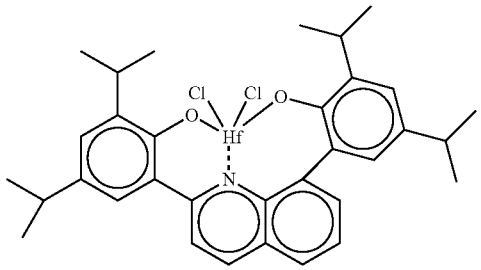

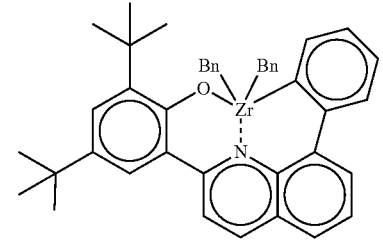

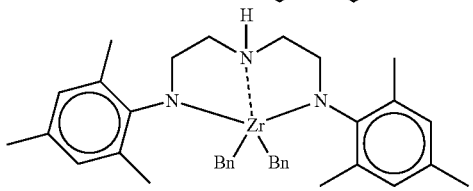

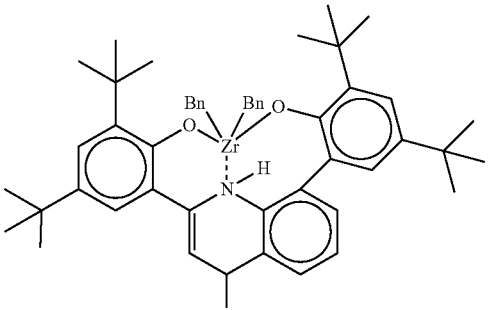

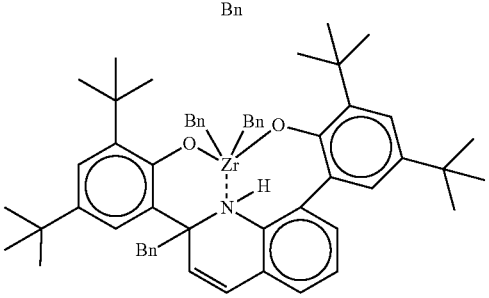

Catalysts made by the method of the invention are supported. Preferred supports are inorganic oxides such as silica, alumina, silica-alumina, magnesia, titania, zirconia, clays, zeolites, or the like. Silica is particularly preferred. When silica is used, it preferably has a surface area in the range of 10 to 1000 m$^2$/g, more preferably from 50 to 800 m$^2$/g and most preferably from 200 to 700 m$^2$/g. Preferably, the pore volume of the silica is in the range of 0.05 to 4.0 mL/g, more preferably from 0.08 to 3.5 mL/g, and most preferably from 0.1 to 3.0 mL/g. Preferably, the average particle size of the silica is in the range of 1 to 500 microns, more preferably from 2 to 200 microns, and most preferably from 2 to 45 microns. The average pore diameter is typically in the range of 5 to 1000 angstroms, preferably 10 to 500 angstroms, and most preferably 20 to 350 angstroms.

The support is preferably treated thermally, chemically, or both prior to use by methods well known in the art to reduce the concentration of surface hydroxyl groups. Thermal treatment consists of heating (or "calcining") the support in a dry atmosphere at elevated temperature, preferably greater than 100° C., and more preferably from 150 to 800° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

Although there are many ways to combine complexes and activators, it is usually far from clear which methods will prove most satisfactory for a particular type of olefin polymerization catalyst. We surprisingly found that non-metallocene dianionic tridentate complexes are effectively activated using combinations of certain boron compounds and alumoxanes when the activator components are precombined. Later combination with complex and support as outlined above provides catalysts with excellent activities for polymerizing olefins.

Method D (below) for preparing a supported catalyst illustrates one method of the invention. As is apparent from the description, the method is simple to practice and involves an "incipient wetness" technique. A minimum amount of solvent is used to deposit catalytic components onto silica. The supported catalyst remains a free-flowing solid throughout the supporting process.

Table 1 shows that Method D, when applied to a variety of non-metallocene tridentate dianionic complexes, provides catalysts with good activities that give high-molecular-weight copolymers of ethylene and 1-butene.

Table 2 shows that a variety of boron compounds having Lewis acidity, when combined with methylalumoxane, provide excellent activation of a non-metallocene complex compared with the same complex activated using MAO only and a slurry technique (Comparative Method A).

Table 3 illustrates that the supporting method of the invention provides superior activation of non-metallocene tridentate dianionic complexes. In particular, Method D (excess MAO+borate, incipient wetness) applied to complexes 39 and 52 gave higher activities when compared with either Comparative Method A (MAO only, slurry technique) or Comparative Method C (borate only, incipient wetness) with the same complexes.

Polymerization Example 16 shows that other well-known non-metallocene tridentate dianionic complexes, such as those based on bis(2-anilinoethyl)amine ligands, are also activated well using Method D. In contrast, Method B (MAO, incipient wetness) fails to provide the same level of activation of the same complex (see Comparative Polymerization Example 17).

The following examples merely illustrate the invention. Those skilled in the art will recognize many variations that are within the spirit of the invention and scope of the claims.

All intermediate compounds and complexes synthesized give satisfactory $^1$H NMR spectra consistent with the structures indicated.

Preparation of Complex 34

8-Bromo-2-(3,5-di-tert-butyl-2-methoxyphenyl)quinoline

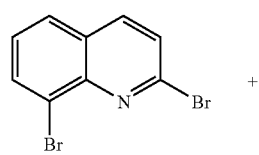

+

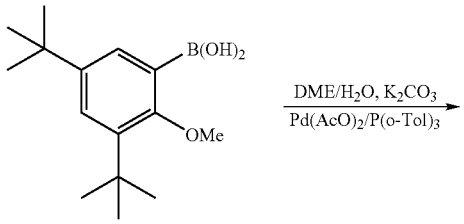

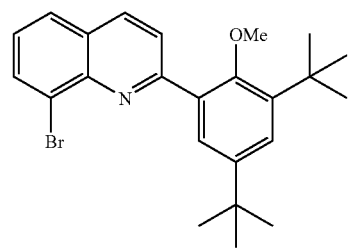

A mixture of 2,8-dibromoquinoline (4.64 g, 16 mmol, prepared by the method of L. Mao et al., *Tetrahedron Lett.* 46 (2005) 8419), 3,5-di-tert-butyl-2-methoxyphenylboronic acid (4.3 g, 16 mmol), $K_2CO_3$ (5.6 g, 40 mmol), $Pd(OAc)_2$ (0.08 g, 0.3 mmol), $P(o-Tol)_3$ (0.2 g, 0.6 mmol), dimethoxyethane (40 mL) and water (10 mL) is refluxed for 8 h with stirring in an argon atmosphere. The mixture is then poured into water and extracted with $CHCl_3$ (3×50 mL). The combined organic phase is washed with water and brine, and then concentrated. The residue is purified by column chromatography (silica gel 40, hexane/$CH_2Cl_2$ 4:1). Yield: 5.2 g (77%).

2-(8-Bromo-2-quinolinyl)-4,6-di-tert-butylphenol

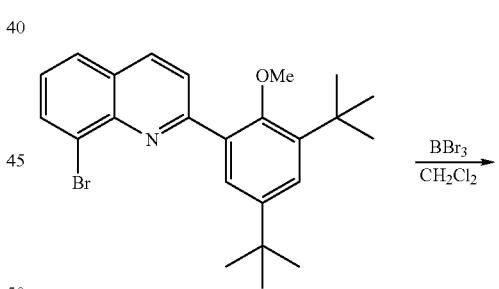

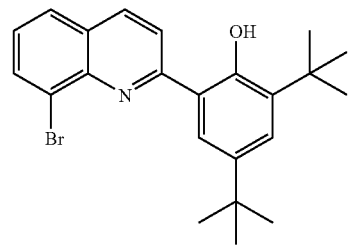

A mixture of 8-bromo-2-(3,5-di-tert-butyl-2-methoxyphenyl)quinoline (4.89 g, 11.5 mmol), $BBr_3$ (1.63 mL, 18 mmol), and $CH_2Cl_2$ (50 mL) is stirred for 4 h at 20° C. The reaction mixture is then diluted with cold water (100 mL). The organic phase is separated, washed with water and brine, and then concentrated. The residue is recrystallized from hexane/benzene. Yield: 3.3 g (70%).

2,4-Di-tert-butyl-6-[8-(2,6-dimethylanilino)-2-quinolinyl]phenol

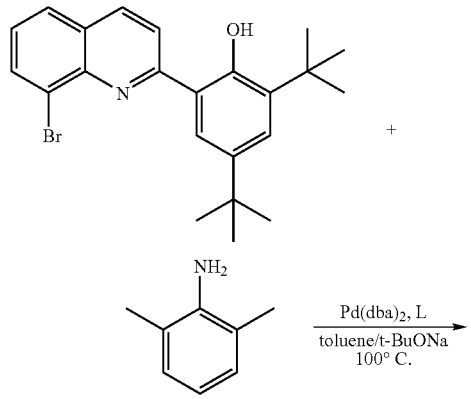

A mixture of 2-(8-bromo-2-quinolinyl)-4,6-di-tert-butylphenol (3.3 g, 8 mmol), 2,6-dimethylaniline (1.2 mL, 10 mmol), Pd(dba)$_2$ (0.036 g, 0.6 mmol), L=(N-[2'-(dicyclohexylphosphino)[1,1'-biphenyl]-2-yl]-N,N-dimethylamine) (0.05 g, 0.12 mmol), NaO$^t$Bu (0.36 g, 3.6 mmol), and toluene (8 mL) is stirred for 8 h under an argon atmosphere at 100° C. The mixture is then poured into water and extracted with benzene (3×50 mL). The combined organic phase is washed with water and brine, and is then concentrated. The residue is purified by column chromatography (silica gel 40, hexane/toluene 2:1). Yield: 2.17 g (60%).

Dibenzylhafnium 2,4-Di-tert-butyl-6-[8-(2,6-dimethylanilino)-2-quinolinyl]-phenolate (34)

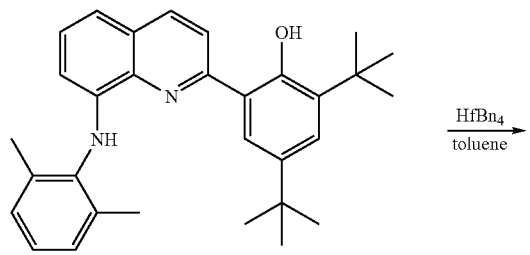

A solution of tetrabenzylhafnium (0.47 g, 0.86 mmol) in toluene (5 mL) is added at 0° C. to a solution of 2,4-di-tert-butyl-6-[8-(2,6-dimethylanilino)-2-quinolinyl]phenol (0.30 g, 0.66 mmol) in toluene (10 mL). The color of the mixture changes from pale yellow to yellow-orange. The resulting mixture is allowed to warm to room temperature and is then stirred for 8 days at 40° C. The mixture is evaporated, and pentane (20 mL) is added. The crystalline precipitate is separated by decantation, washed with pentane, and dried in vacuo. Yield of 34, a yellow crystalline powder: 0.26 g (48%).
$^1$H NMR (C$_6$D$_6$) δ: 7.74-7.66 (m, 3H); 7.45 (d, 1H); 7.22 (d, 1H); 7.15-7.13 (m, 3H); 6.99 (t, 1H); 6.79-6.62 (m, 10H); 6.18 (d, 1H); 2.40 (d, 2H); 2.31 (s, 6H); 1.97 (d, 2H); 1.75 (s, 9H); 1.36 (s, 9H).

Preparation of Complex 36

8-Bromo-2-(1-naphthyl)quinoline

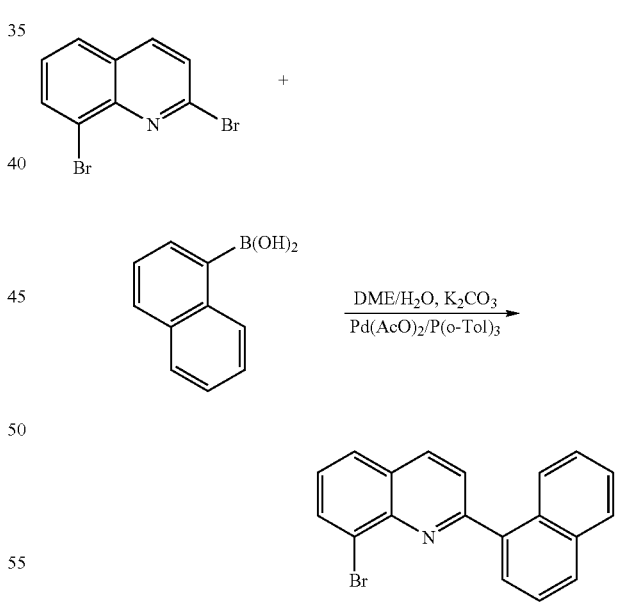

A mixture of 2,8-dibromoquinoline (6.0 g, 21 mmol, prepared by the method of L. Mao et al., *Tetrahedron Lett.* 46 (2005) 8419), 1-naphthylboronic acid (4.1 g, 24 mmol), K$_2$CO$_3$ (6.6 g, 48 mmol), Pd(OAc)$_2$ (0.1 g, 0.4 mmol), P(o-Tol)$_3$ (0.25 g, 0.8 mmol), DME (50 mL) and water (10 mL) is refluxed for 6 h under stirring in an argon atmosphere. The mixture is then poured into water and extracted with CHCl$_3$ (3×50 mL). The combined organic phase is washed with water and brine, and then concentrated. The residue is purified by column chromatography (silica gel 40, hexane/benzene 1:1). Yield of red purple oil: 4.1 g (57%).

N-(2,6-dimethylphenyl)-2-(1-naphthyl)-8-quinolinamine

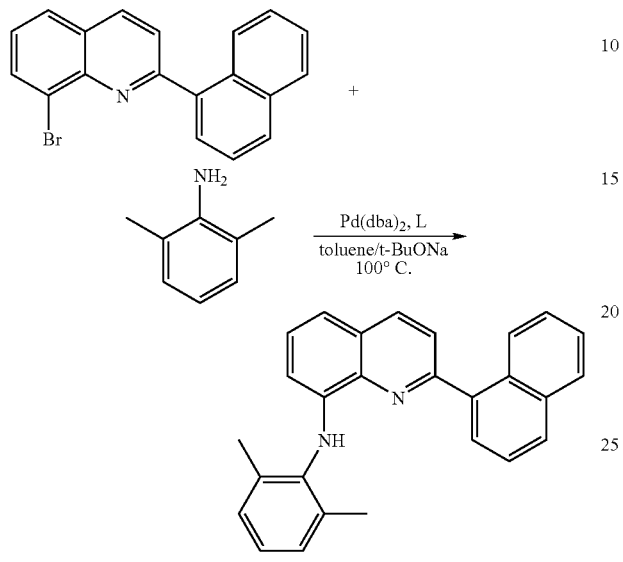

A mixture of 8-bromo-2-(1-naphthyl)quinoline (2.03 g, 6 mmol), 2,6-dimethylaniline (0.83 mL, 6.9 mmol), Pd(dba)$_2$ (0.072 g, 0.12 mmol), L=(N-[2'-(dicyclohexylphosphino)[1,1'-biphenyl]-2-yl]-N,N-dimethylamine) (0.094 g, 0.24 mmol), NaOtBu (0.72 g, 7.2 mmol) and toluene (15 mL) is stirred for 8 h under an argon atmosphere at 100° C. in an oil bath. The mixture is then poured into water and extracted with benzene (3×50 mL). The combined organic phase is washed with water and brine, and then concentrated. The residue is purified by column chromatography (silica gel 40, hexane/toluene 2:1). Yield: 1.59 g (71%).

Dibenzylzirconium N-(2,6-Dimethylphenyl)-2-(1-naphthyl)-8-quinolinamide (36)

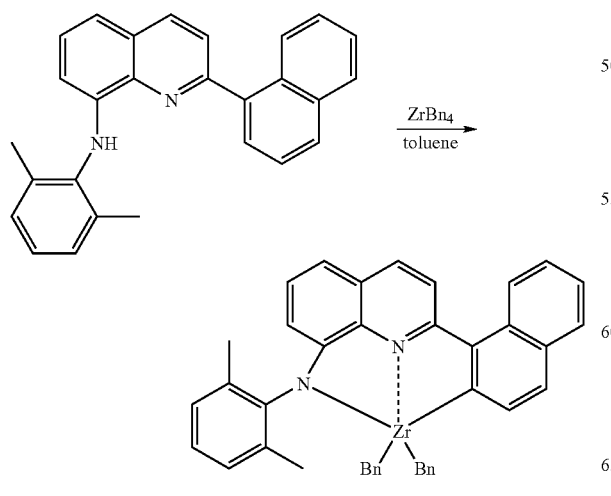

A solution of tetrabenzylzirconium (1.10 g, 2.4 mmol) in toluene (10 mL) is added at 0° C. to a solution of N-(2,6-dimethylphenyl)-2-(1-naphthyl)-8-quinolinamine (0.75 g, 2 mmol) in toluene (20 mL). The color of the mixture changes from pale yellow to dark red. The resulting mixture is allowed to warm to room temperature and is then stirred for 4 h at 50° C. The mixture is concentrated to about 10 mL, and hexane (20 mL) is added. The crystalline precipitate is separated by decantation, washed with pentane, and dried in vacuo. Yield of 36. a red-violet crystalline powder: 0.74 g (57%). $^1$H NMR (toluene-d$_8$) δ: 8.40 (d, 1H); 8.08 (d, 1H); 7.99 (d, 1H); 7.69 (t, 2H); 7.56 (d, 1H); 7.40-7.27 (m, 4H); 7.17-6.96 (m, 3H); 6.64 (m, 4H); 6.56 (m, 2H); 6.41 (m, 4H); 6.21 (d, 1H); 2.33 (d, 2H); 2.18 (s, 3H); 2.13 (s, 3H); 1.83 (d, 2H).

Preparation of Complex 37

Dibenzylhafnium N-(2,6-Dimethylphenyl)-2-(1-naphthyl)-8-quinolinamide

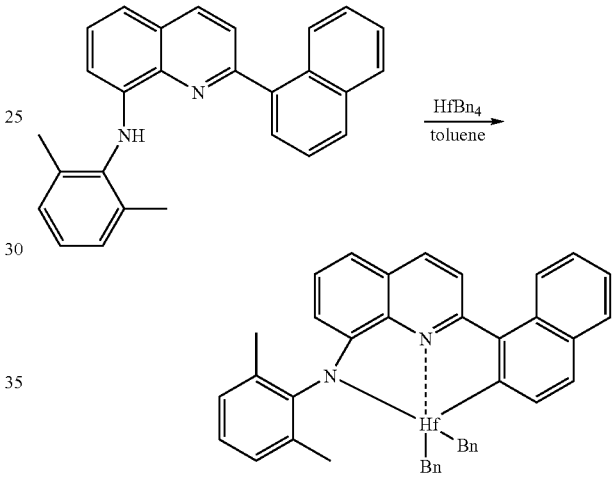

A solution of tetrabenzylhafnium (1.14 g, 2.1 mmol) in toluene (10 mL) is added at 0° C. to a solution of N-(2,6-dimethylphenyl)-2-(1-naphthyl)-8-quinolinamine (0.65 g, 1.75 mmol) in toluene (15 mL). The color of the mixture changes from pale yellow to red. The resulting mixture is allowed to warm to room temperature and is then stirred for 8 h at 60° C. The mixture is concentrated to about 10 mL, and hexane (20 mL) is added. The crystalline precipitate is separated by decantation, washed with pentane, and dried in vacuo. Yield of 37, a red crystalline powder: 0.81 g (63%).

Preparation of Complex 38

Dibenzylhafnium N-(2,6-Diisopropylphenyl)-2-(1-naphthyl)-8-quinolinamide

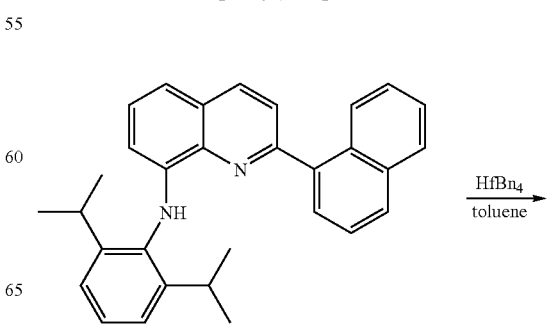

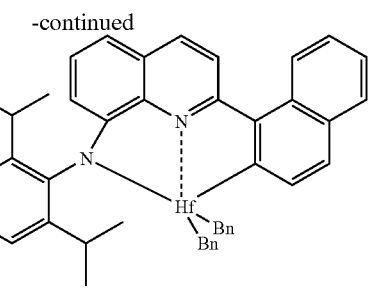

A solution of tetrabenzylhafnium (1.17 g, 2.15 mmol) in toluene (10 mL) is added at 0° C. to a solution of N-(2,6-diisopropylphenyl)-2-(1-naphthyl)-8-quinolinamine (0.69 g, 1.6 mmol) in toluene (15 mL). The color of the mixture changes from pale yellow to red. The resulting mixture is allowed to warm to room temperature and is then stirred for 8 h at 60° C. The mixture is concentrated to about 10 mL, and hexane (20 mL) is added. The crystalline precipitate is separated by decantation, washed with pentane, and dried in vacuo. Yield of red crystalline powder: 0.68 g (54%). $^1$H NMR (benzene-$d_6$) δ: 8.22 (d, 1H); 8.12 (d, 1H); 7.71 (d, 1H); 7.57 (m, 2H); 7.40 (d, 1H); 7.16 (m, 4H); 7.00 (m, 2H); 6.67 (d, 1H); 6.52-6.36 (m, 10H); 6.10 (d, 1H); 3.41 (sept, 2H); 2.26 (d, 2H); 2.03 (d, 2H); 1.10 (d, 6H); 0.88 (d, 6H).

Preparation of Complex 39

N-(2,6-Diisopropylphenyl)-2-(1-naphthyl)-8-quinolinamine

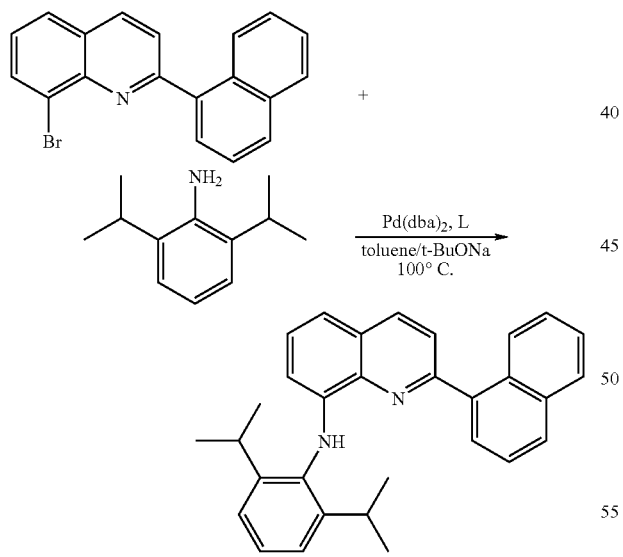

A mixture of 8-bromo-2-(1-naphthyl)quinoline (2.03 g, 6 mmol), 2,6-diisopropylaniline (1.3 ml, 7 mmol), Pd(dba)$_2$ (72 mg, 0.12 mmol), L=(N-[2'-(dicyclohexylphosphino)[1,1'-biphenyl]-2-yl]-N,N-dimethylamine (94 mg, 0.24 mmol), NaO$^t$Bu (0.72 g, 7.2 mol) and toluene (15 mL) is stirred for 8 h under an argon atmosphere at 105° C. in an oil bath. The mixture is then poured into water and extracted with benzene (3×50 mL). The combined organic phase is washed with water and brine, and is then concentrated. The residue is purified by column chromatography (silica gel 40, hexane/toluene 2:1). Yield: 1.7 g (66%).

Dibenzylzirconium N-(2,6-Diisopropylphenyl)-2-(1-naphthyl)-8-quinolinamide (39)

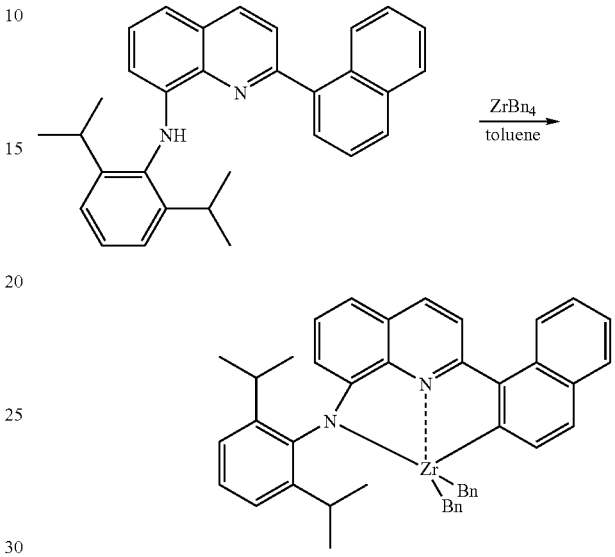

A solution of tetrabenzylzirconium (1.23 g, 2.7 mmol) in toluene (10 mL) is added at 0° C. to a solution of N-(2,6-diisopropylphenyl)-2-(1-naphthyl)-8-quinolinamine (0.95 g, 2.2 mmol) in toluene (20 mL). The color of the mixture changes from pale yellow to dark red. The resulting mixture is allowed to warm to room temperature and is then stirred for 8 h at 60° C. Toluene is evaporated, and the residue is extracted with pentane. The product crystallizes very slowly! Yield of 39, a red-violet crystalline powder: 0.55 g (36%). $^1$H NMR (toluene-$d_8$) δ: 8.31 (d, 1H); 8.11 (d, 1H); 7.94 (d, 1H); 7.68 (t, 2H); 7.55 (d, 1H); 7.29 (m, 4H); 7.14 (m, 2H); 6.96 (m, 1H); 6.64 (m, 4H); 6.52 (m, 6H); 6.26 (d, 1H); 3.49 (sept, 2H); 2.50 (d, 2H); 2.01 (d, 2H); 1.26 (d, 6H); 1.05 (d, 6H).

Preparation of Complex 44

N-(2-Methyl-1-naphthyl)-2-(1-naphthyl)-8-quinolinamine

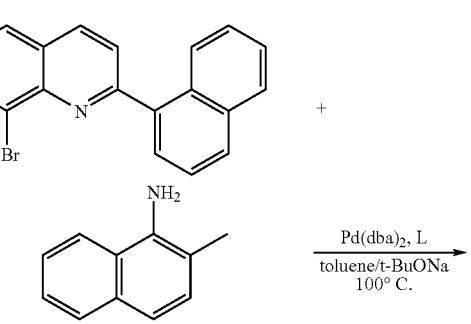

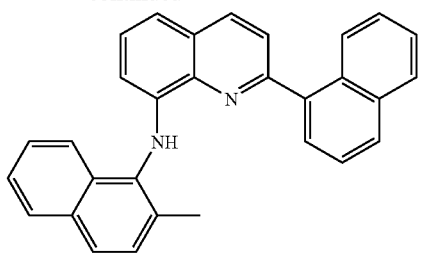

A mixture of 8-bromo-2-(1-naphthyl)quinoline (3.25 g, 9.7 mmol), 2-methyl-1-naphthalenamine (1.76 g, 11.2 mmol), Pd(dba)$_2$ (0.12 g, 0.2 mmol), L=(N-[2'-(dicyclohexylphosphino)[1,1'-biphenyl]-2-yl]-N,N-dimethylamine (0.15 g, 0.4 mmol), NaO$^t$Bu (1.15 g, 12 mmol) and toluene (20 mL) is stirred for 8 h under an argon atmosphere at 100° C. in oil bath. The mixture is then poured into water and extracted with benzene (3×40 mL). The combined organic phases are washed with water and brine and then concentrated. The residue is purified by column chromatography (silica gel 40, hexane/toluene 4:1). Yield 3.1 g (78%).

Dibenzylzirconium N-(2-Methyl-1-naphthyl)-2-(1-naphthyl)-8-quinolinamide (44)

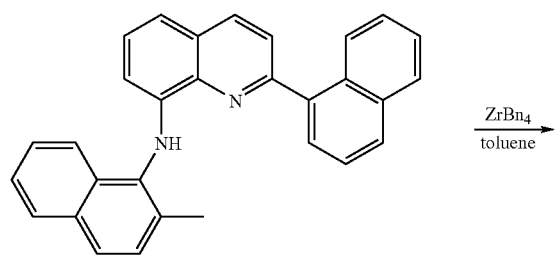

A solution of tetrabenzylzirconium (0.51 g, 1.12 mmol) in toluene (5 mL) is added at 0° C. to a solution of N-(2,6-diisopropylphenyl)-2-(1-naphthyl)-8-quinolinamine (0.37 g, 0.9 mmol) in toluene (15 mL). The color of the mixture changes from pale yellow to dark red. The resulting mixture is allowed to warm to room temperature and is then stirred for 8 h at 60° C. Toluene is evaporated, and the residue is extracted with pentane and crystallized. Yield of 44, a dark red-violet crystalline powder: 0.28 g (46%). $^1$H NMR (toluene-d$_8$) δ: 8.44 (d, 1H); 8.06 (d, 1H); 8.01 (d, 1H); 7.95 (d, 1H); 7.74 (d, 1H); 7.69 (m, 1H); 7.65 (d, 1H); 7.50 (d, 1H); 7.39-7.21 (m, 5H); 6.57 (m, 3H); 6.40 (m, 3H); 6.32 (m, 2H); 6.26 (m, 2H); 6.1 (d, 1H); 2.34 (d, 1H); 2.30 (s, 3H); 2.29 (d, 1H); 1.75 (d, 1H), 1.59 (d, 1H).

Preparation of Complex 52

2,4-Di-tert-butyl-1-(methoxymethoxy)benzene

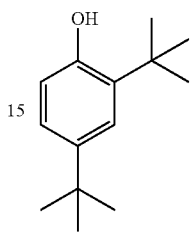

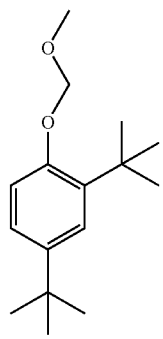

A solution of 2,4-di-tert-butylphenol (20.6 g, 0.1 mol) in dry THF (50 mL) is added with stirring to a suspension of NaH (2.4 g, 0.1 mol) in dry THF (150 mL). After 1 h of stirring, the mixture is cooled to 0° C., and chloromethyl methyl ether (7.6 mL, 0.1 mol) is added. The reaction mixture is stirred at room temperature for 2 h, quenched with water (500 mL) and extracted with Et$_2$O (2×100 mL). The combined organic phase is dried over MgSO$_4$ and evaporated under reduced pressure. The residue is used for the next step without purification.

2,8-Bis(2-methoxymethoxy-3,5-di-tert-butylphenyl)quinoline

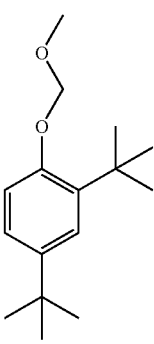

142.4; 139.3; 137.8; 137.6; 135.9; 135.6; 132.67; 127.9; 126.9; 126.7; 126.3; 125.3; 125.0; 124.2; 121.4; 118.6; 117.9; 35.2; 35.1; 34.4; 34.3; 31.65; 31.6; 29.9; 29.5.

Dibenzylzirconium 2-benzyl-2,8-bis(3,5-di-tert-butyl-6-phenolato)-1,2-dihydro-quinoline (52)

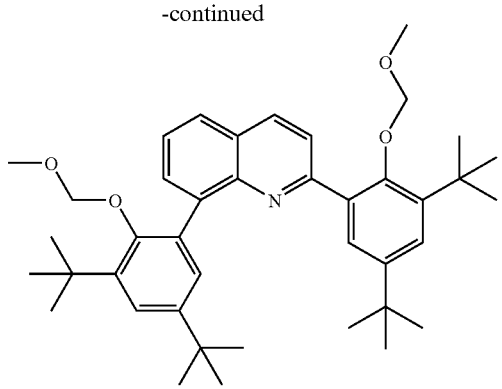

n-Butyllithium (8 mL of 2.5 M solution in hexane) is added to a solution of 2,4-di-tert-butyl-1-(methoxymethoxy)benzene (4.8 g, 19.2 mmol) in Et$_2$O (100 mL). The mixture is stirred at room temperature for 3 h. THF (80 mL) and zinc chloride (2.6 g, 19.2 mmol) are then added and stirred until the ZnCl$_2$ dissolves. After that, Pd(dba)$_2$ (0.3 g), P(o-Tol)$_3$ (0.3 g), and 2,8-dibromoquinoline (2.6 g, 9 mmol) are added. The mixture is stirred overnight, then poured into excess water and extracted with Et$_2$O (3×100 mL). The combined organic phase is dried over MgSO$_4$ and concentrated under reduced pressure. The product is purified by column chromatography (SiO$_2$, hexane/CHCl$_3$ 1:1). Yield: 2.6 g (46%).

2,8-Bis(2-hydroxy-3,5-di-tert-butylphenyl)quinoline

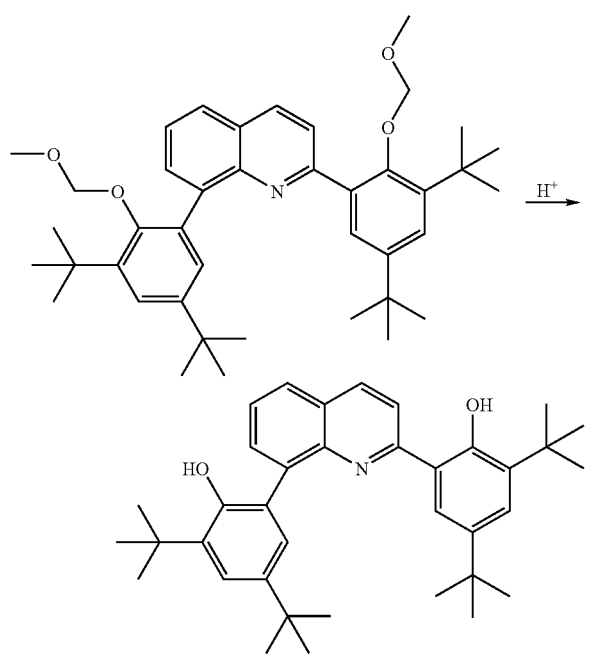

A mixture of 2,8-bis(2-methoxymethoxy-3,5-di-tert-butylphenyl)quinoline (2.6 g) and 5% aq. HCl (30 mL) is heated on a water bath for 1 h. After cooling, the product is filtered off and recrystallized from methanol. Yield: 2 g (90%). $^1$H NMR (CDCl$_3$) δ: 13.73 (br. s., 1H); 8.32 (d, 1H); 8.10 (d, 1H); 7.91 (d, 1H); 7.83 (d, 1H); 7.78 (d, 1H); 7.65 (t, 1H); 7.53 (d, 1H); 7.42 (d, 1H); 7.14 (d, 1H); 4.95 (b.s., 1H); 1.51 (s, 9H); 1.39 (s, 27H). $^{13}$C NMR (CDCl$_3$) δ: 159.4; 157.5; 149.1; 144.1;

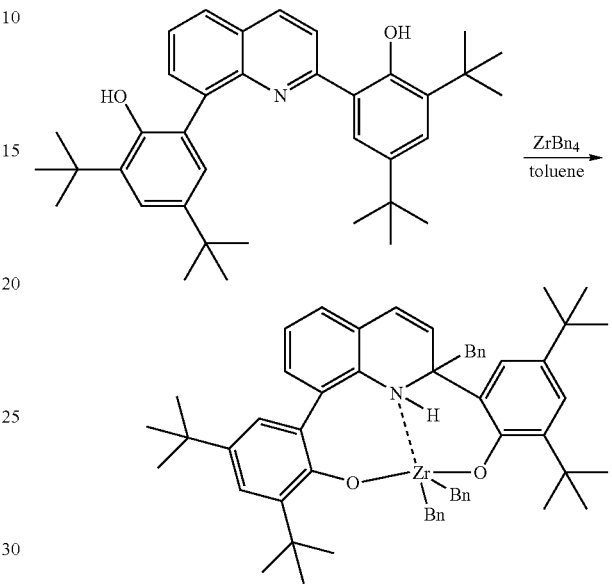

Tetrabenzylzirconium (0.46 g, 1 mmol) is added at 0° C. to a solution of 2,8-bis(2-hydroxy-3,5-di-tert-butylphenyl)quinoline (0.44 g, 0.82 mmol) in toluene (20 mL). The resulting mixture is allowed to warm to room temperature and is then stirred for 8 h at 45-50° C. The color of the mixture changes from pale yellow to yellow-orange. Toluene is evaporated and the residue is treated with hexane. A crystalline solid, the primary product, forms. This solid is recrystallized from hexane (hence the temperature of the solution reaches at least 60-70° C.), and a secondary product is isolated. Yield of 52, a yellow crystalline powder: 0.39 g (59%). The structure of 52 is confirmed by an X-ray crystal structure and $^1$H NMR spectrum of the recrystallized product.

Preparation of Supported Catalysts

Comparative Method A

A mixture of silica (Davison 948, calcined at 250° C. for 4 h, 2.0 g), methylalumoxane (30 wt. % solution of MAO in toluene, product of Albemarle, 2.2 mL), and toluene (10 mL) is stirred under nitrogen for 1 h at 80° C. The resulting slurry is cooled to ambient temperature, and a specified amount of catalyst precursor is added, dry or in toluene solution, under stirring. After 30 min., the slurry is filtered and the solids are rinsed with hexanes (2×5 mL) and dried. The resulting catalyst is used in polymerization tests.

Comparative Method B

A specified amount of complex precursor is added to methylalumoxane (30 wt. % solution of MAO in toluene, 2.2 mL) and the mixture is stirred at ambient temperature for 15 min. The mixture is then slowly added to a stirred bed of silica (Davison 948, calcined at 600° C. for 6 h, 2.0 g). The resulting free-flowing powder is used in polymerization tests.

Comparative Method C

A specified amount of complex precursor is added to a solution of a specified amount of trityl tetrakis(pentafluorophenyl)borate in toluene (2.2 mL). The mixture is stirred at ambient temperature for 15 min. Thereafter, the mixture is slowly added to a stirred bed of silica (Davison 948, calcined at 600° C. for 6 h, 2.0 g). The resulting free-flowing powder is used in polymerization tests.

Method D

Trityl tetrakis(pentafluorophenyl)borate ("F20," 0.093 g) is added to methylalumoxane (30 wt. % solution of MAO in toluene, 2.0 mL), and the mixture is stirred for 15 min. A specified amount of complex precursor is added to the MAO/borate solution, and the mixture stirs for an additional 15 min. The resulting product is slowly added to a stirred bed of silica (Davison 948, calcined at 600° C. for 6 h, 2.0 g). The resulting free-flowing powder is used in polymerization tests.

Ethylene Polymerization: General Procedure

A dry, 2-L stainless-steel autoclave is charged with isobutane (1.0 L), triisobutylaluminum (1 M solution in hexanes, 2 mL), 1-butene (100 mL) and, optionally, hydrogen, and the contents are heated to 70° C. and pressurized with ethylene (15.5 psi partial pressure). Polymerization is started by injecting the catalyst with a small quantity of isobutane. The temperature is maintained at 70° C., and ethylene is supplied on demand throughout the test. The reaction is terminated by cooling the reactor and venting its contents.

Polymerization Example 1, for instance, uses a catalyst batch prepared using Method D and complex 34 (97.0 mg) resulting in an Al/B/Hf ratio of 77/1.2/1. A sample of catalyst corresponding to 5.0 mg of the complex is used in the polymerization test. The test yields 14.6 g of high molecular weight ethylene/butene copolymer in 70 minutes (activity: 2027 kg/mol Hf/h). Polymerization Exs. 2-6 are performed analogously. Results appear in Table 1.

TABLE 1

Polymerization Results

| Ex | Complex, amt (mg) | Support method | Al/B/M (molar) | Complex in test (mg) | Polymer yield | Time (min) | Activity (kg/mol M/h) |
|---|---|---|---|---|---|---|---|
| 1 | 34 (97.0) | D | 77/1.2/1 | 5.0 | 14.6 | 70 | 2027 |
| 2 | 36 (31.6) | D | 190/1.2/1 | 5.2 | 36.3 | 56 | 4824 |
| 3 | 38 (38.7) | D | 190/1.2/1 | 5.0 | 8.8 | 78 | 1067 |
| 4 | 39 (34.3) | D | 190/1.2/1 | 5.0 | 36.8 | 77 | 5113 |
| 5 | 44 (33.4) | D | 190/1.2/1 | 5.0 | 32.2 | 90 | 2925 |
| 6 | 52 (39.6) | D | 190/1.2/1 | 5.0 | 43.9 | 39 | 10,914 |

Polymerization Examples 7-10

Effect of Boron Activators with Complex 44

Method D is used to make supported catalysts from complex 44, MAO, and the boron compounds shown in Table 2. The procedure of Polymerization Example 5 is generally followed except that hydrogen is used in the amounts shown, and the resulting catalyst activities are reported in the table.

TABLE 2

Effect of Boron Activators with Complex 44

| Ex. # | Activator = MAO + . . . | Al/B/Zr (molar) | $H_2$, moles | Activity (kg/mol Zr/h) |
|---|---|---|---|---|
| 5 | $Ph_3C + B(C_6F_5)_4^-$ | 190/1.2/1 | 0 | 2925 |
| 7 | $Ph_3C + B(C_6F_5)_4^-$ | 190/1.2/1 | 0.085 | 5751 |
| 8 | $B(C_6F_5)_3$ | 190/1.2/1 | 0.085 | 7082 |
| 9 | $(C_6F_5)_2BOH$ | 190/1.4/1 | 0.085 | 5448 |
| 10 | $(C_6F_5)B(OH)_2$ | 190/1.4/1 | 0.085 | 9560 |
| C11 | no boron activator | 100/0/1 | 0 | 871 |

Comparative Polymerization Example 11

Comparative Method A is used to make a supported catalyst from Complex 44, except that the silica is calcined at 600° C. The polymerization is performed in the absence of hydrogen, and with only MAO as the activator. The activity is 871 kg/mol/h.

Effect of Supporting Method

Comparative Examples 12-15

For Comparative Examples 12-15, complexes 39 and 52 are supported using MAO/silica, slurry technique (Comparative Method A) or F20/silica, incipient wetness (Comparative Method C). The polymerization results are compared with those from the same complexes supported using Method D (Examples 4 and 6). Results appear in Table 3.

TABLE 3

Effect of Supporting Method

| Ex | Complex, amt (mg) | Support method | Al/B/M (molar) | Complex in test (mg) | Polymer yield | Time (min) | Activity (kg/mol M/h) |
|---|---|---|---|---|---|---|---|
| 4 | 39 (34.3) | D | 190/1.2/1 | 5.0 | 36.8 | 77 | 5113 |
| C12 | 39 (58.0) | A | 100/0/1 | 3.0 | 8.1 | 56 | 2030 |
| C13 | 39 (19.0) | A | 300/0/1 | 6.0 | 34.8 | 60 | 4066 |
| C14 | 39 (65.0) | C | 0/4/1 | 2.1 | 3.6 | 92 | 783 |
| 6 | 52 (39.6) | D | 190/1.2/1 | 5.0 | 43.9 | 39 | 10,914 |
| C15 | 52 (75.0) | A | 100/0/1 | 5.0 | 4.1 | 70 | 568 |

Polymerization Example 16

A catalyst batch is prepared using Method D and the dianionic complex [(MesN—CH$_2$CH$_2$)$_2$NH]ZrBn$_2$ which is prepared by combining [MesNH—CH$_2$CH$_2$]$_2$NH (40.0 mg) with ZrBn$_4$ (28.0 mg; Al/Zr ratio of 150/1.2/1 in the catalyst). A sample of catalyst corresponding to 2.0 mg of precatalyst is used in the polymerization test, producing 89.3 g of high-molecular-weight ethylene/butene copolymer in 40 minutes (activity: 30,473 kg/mol Zr/h).

Comparative Polymerization Example 17

A catalyst batch is prepared using Comparative Method B and the dianionic complex [(MesN—CH$_2$CH$_2$)$_2$NH]ZrBn$_2$ which is prepared by combining [MesNH—CH$_2$CH$_2$]$_2$NH (40.0 mg) with ZrBn$_4$ (28.0 mg; Al/Zr ratio of 150 in the catalyst). A sample of catalyst corresponding to 5.0 mg of precatalyst is used in the polymerization test, producing 115 g of high-molecular-weight ethylene/butene copolymer in 100 minutes (activity: 6279 kg/mol Zr/h).

The preceding examples are meant only as illustrations. The following claims define the invention.

We claim:

1. A method of preparing a supported catalyst useful for polymerizing olefins, comprising: (a) combining a boron compound having Lewis acidity with excess alumoxane to produce an activator mixture; and (b) combining the activator mixture with a support and a dianionic, tridentate Group 4 metal complex to give the supported catalyst, wherein the complex comprises a 2-aryl-8-anilinoquinoline ligand.

2. The method of claim 1 wherein the boron compound is selected from the group consisting of boranes, boronic acids, borinic acids, and ionic borates.

3. The method of claim 1 wherein the alumoxane is methylalumoxane.

4. The method of claim 1 wherein the alumoxane and boron compound are used in amounts that provide an aluminum to boron (Al/B) molar ratio within the range of 2:1 to 1000:1.

5. The method of claim 4 wherein the Al/B molar ratio is within the range of 50:1 to 250:1.

6. The method of claim 1 wherein the support is silica.

7. The method of claim 6 wherein the silica has a surface area in the range of 10 to 1000 m$^2$/g.

8. The method of claim 7 wherein the silica has a surface area in the range of 200 to 700 m$^2$/g.

9. The method of claim 6 wherein the silica has a particle size in the range of 1 to 500 microns.

10. The method of claim 9 wherein the silica as a particle size in the range of 2 to 45 microns.

11. The method of claim 6 wherein the silica has a pore volume in the range of 0.05 to 4.0 mL/g.

12. The method of claim 6 wherein the silica has an average pore diameter in the range of 20 to 350 angstroms.

13. The method of claim 1 wherein the support is calcined at a temperature greater than 200° C.

14. The method of claim 1 wherein the activator mixture is first combined with the complex, followed by the support.

15. The method of claim 1 wherein the activator mixture is first combined with the support, followed by the complex.

16. The method of claim 1 wherein the 2-aryl-8-anilinoquinoline ligand has the following structure:

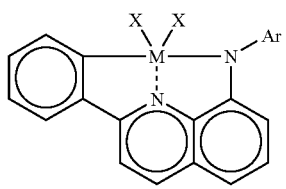

wherein M is a Group 4 transition metal, Ar is an aryl group, each X is independently selected from the group consisting of halide, amide, alkyl, and alkaryl, and further wherein any of the ring carbons is optionally substituted with an alkyl, aryl, halide, alkoxy, dialkylamino, or haloalkyl group, or any pair of adjacent ring carbons are joined to form a 5 to 7-membered carbocyclic or heterocyclic ring.

17. The method of claim 1 wherein the boron compound is lithium tetrakis(pentafluorophenyl)borate, sodium tetrakis(pentafluorophenyl)borate, anilinium tetrakis(pentafluorophenyl)borate, trityl tetrakis(pentafluorophenyl)borate, tris(pentafluorophenyl)borane, triphenylborane, tri-n-octylborane, bis(pentafluorophenyl)borinic acid, pentafluorophenylboronic acid.

18. The method of claim 1 wherein the alumoxane is ethylalumoxane.

19. The method of claim 1 wherein the alumoxane is isobutylalumoxane.

20. The method of claim 1 wherein the support is alumina, silica-alumina, magnesia, titania, zirconia, clay, zeolite, or some combination thereof.

* * * * *